(12) United States Patent
Kozinski

(10) Patent No.: US 9,242,585 B2
(45) Date of Patent: Jan. 26, 2016

(54) INFANT CAR SEAT ASSEMBLY

(71) Applicant: Micheal Kozinski, Valparaiso, IN (US)

(72) Inventor: Micheal Kozinski, Valparaiso, IN (US)

(*) Notice: Subject to any disclaimer, the term of this patent is extended or adjusted under 35 U.S.C. 154(b) by 0 days.

(21) Appl. No.: 14/797,307

(22) Filed: Jul. 13, 2015

(65) Prior Publication Data
US 2015/0329017 A1 Nov. 19, 2015

Related U.S. Application Data

(63) Continuation-in-part of application No. 13/910,838, filed on Jun. 5, 2013, now Pat. No. 9,108,654.

(60) Provisional application No. 61/655,711, filed on Jun. 5, 2012.

(51) Int. Cl.
B60B 1/00 (2006.01)
B60N 2/28 (2006.01)
F16M 11/16 (2006.01)
F16M 11/38 (2006.01)
F16M 11/42 (2006.01)

(52) U.S. Cl.
CPC ............. B60N 2/2848 (2013.01); F16M 11/16 (2013.01); F16M 11/38 (2013.01); F16M 11/42 (2013.01)

(58) Field of Classification Search
CPC ........ B62B 7/08; B62B 3/02; B62B 2205/20; A61G 5/08
USPC ............................. 280/35, 639, 642, 541, 647
See application file for complete search history.

(56) References Cited

U.S. PATENT DOCUMENTS 7,658,399 B2 * 2/2010 Van Dijk ............... B62B 7/142
                                                        280/30
8,205,906 B2 * 6/2012 Kretschmer ............ B62B 7/123
                                                        280/47.38
2012/0119457 A1 * 5/2012 Williams ............. B60N 2/2821
                                                        280/30

* cited by examiner

Primary Examiner — John Walters
Assistant Examiner — James Triggs
(74) Attorney, Agent, or Firm — Hartman Global IP Law; Gary M. Hartman; Michael D. Winter

(57) ABSTRACT

Infant car seat assemblies suitable for functioning as both a car seat and a stroller and capable of functioning with a wide variety of commercially available car seats. The infant car seat assembly for providing mobility to an infant car seat includes at least two hubs, a pair of front legs and a pair of rear legs secured to the hubs at uppermost extents thereof and having at least two wheel assemblies secured to lowermost extents thereof, and at least two adapters configured to releasably secure the hubs to the infant car seat.

20 Claims, 18 Drawing Sheets

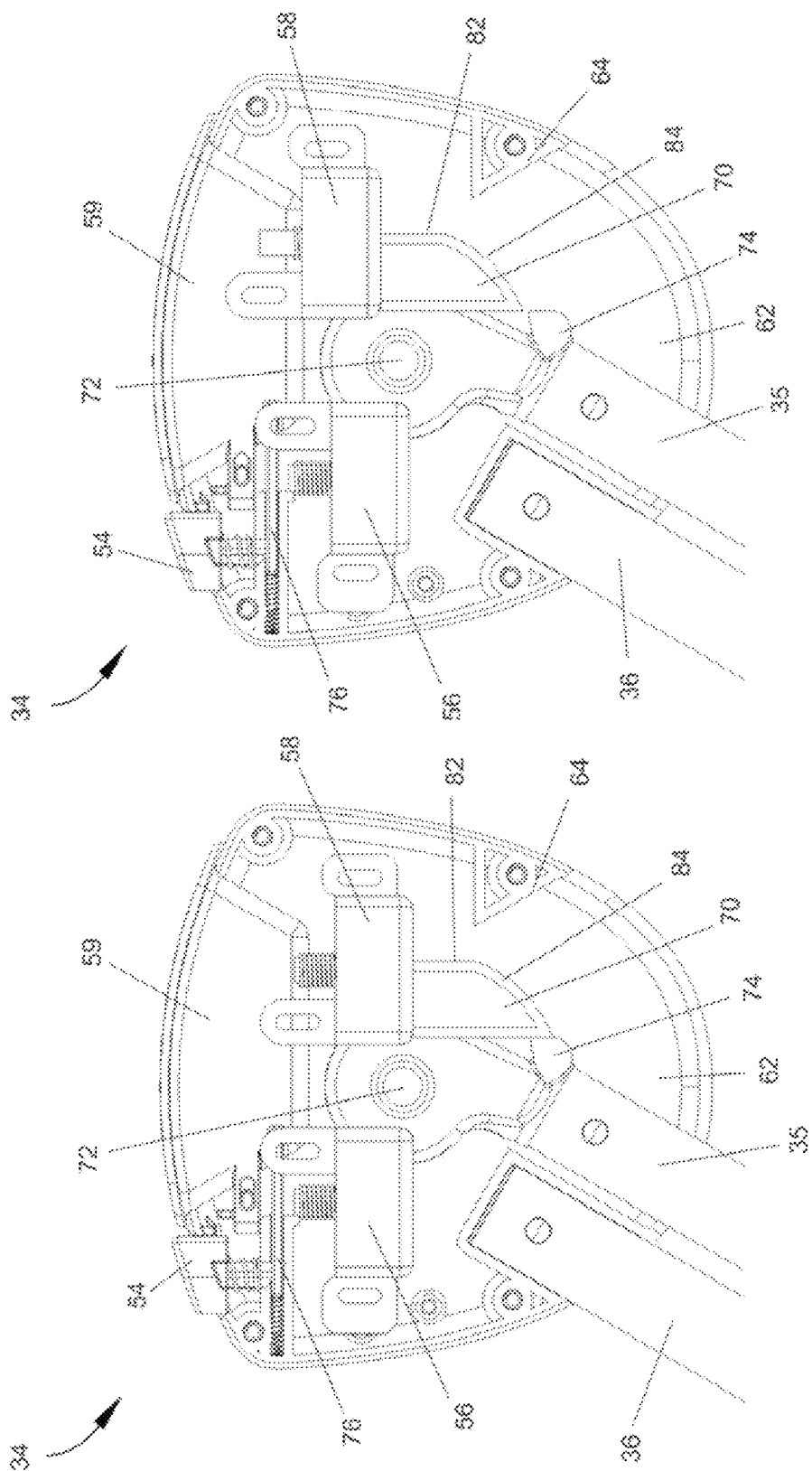

INFANT CAR SEAT ASSEMBLY

CROSS REFERENCE TO RELATED APPLICATIONS

This is a continuation-in-part patent application of co-pending U.S. patent application Ser. No. 13/910,838, filed Jun. 5, 2013, which claimed the benefit of U.S. Provisional Application No. 61/655,711, filed Jun. 5, 2012. The contents of these prior applications are incorporated herein by reference.

BACKGROUND OF THE INVENTION

The present invention generally relates to child safety devices. More particularly, this invention relates to infant car seats capable of functioning as strollers.

Child car seats are required by law in every state in the United States. While specific laws regarding age and weight requirements vary from state to state, most states require infants younger than one to be restrained in a rear-facing infant car seat. Children this young are generally unable to walk or stand, and as such are typically carried in a stroller when they are taken out for any extended duration. As a result, parents and care givers of infants, in order to transport their infant, often must first place the infant in an infant car seat while driving, then place them in a stroller upon leaving the car. This creates the need for both a stroller and a car seat, two devices which fill similar but distinct roles.

To address the above, various combination car seat-stroller designs have been proposed. However, such designs can compromise the ability of the device to safely function as a car seat, or may be impractical to use. Other proposed designs include attachments for infant car seats that enable a car seat to function as a stroller. Such devices can be limited for use with specially configured car seats or may need to be removed before the car seat can be replaced in the car.

In view of the above, it can be appreciated that there are certain problems, shortcomings or disadvantages associated with the prior art, and that it would be desirable if an improved infant car seat were available that was capable of functioning as both a car seat and a stroller, and was also capable of functioning with a wide variety of commercially available car seats.

BRIEF DESCRIPTION OF THE INVENTION

The present invention provides infant car seat assemblies suitable for functioning as both a car seat and a stroller and capable of functioning with a wide variety of commercially available car seats.

According to a first aspect of the invention, an infant car seat assembly for providing mobility to an infant car seat includes at least two hubs, a pair of front legs secured to the hubs at uppermost extents thereof and having at least two wheel assemblies secured to lowermost extents thereof, a pair of rear legs secured to the hubs at uppermost extents thereof and having at least two wheel assemblies secured to lowermost extents thereof, and at least two adapters configured to releasably secure the hubs to the infant car seat.

According to a second aspect of the invention, an infant car seat assembly for providing mobility to an infant car seat includes at least two hubs, a pair of front legs secured to the hubs at uppermost extents thereof and having at least two wheel assemblies secured to lowermost extents thereof, and a pair of rear legs secured to the hubs at uppermost extents thereof and having at least two wheel assemblies secured to lowermost extents thereof. The infant car seat assembly is adapted to secure to the infant car seat and the infant car seat can function in a vehicle without detaching the infant car seat assembly from the infant car seat.

According to another aspect of the invention, an infant car seat assembly for providing mobility to an infant car seat includes at least two hubs configured to be secured to the infant car seat at connections therebetween and configured to rotate about the connections when the at least two hubs are secured to the infant car seat, a pair of front legs secured to the hubs at uppermost extents thereof and having at least two wheel assemblies secured to lowermost extents thereof, and a pair of rear legs secured to the hubs at uppermost extents thereof and having at least two wheel assemblies secured to lowermost extents thereof. At least one of the pair of front legs and the pair of rear legs are configured to pivot about an axis between the uppermost extents thereof within the at least two hubs. The pair of front legs and the pair of rear legs are configured to be rotated in the same direction relative to the infant car seat when the at least two hubs are rotated about the connections between the at least two hubs and the infant car seat when the at least two hubs are secured to the infant car seat. The at least two hubs are configured to rotatably lock in at least a first locking position such that the pair of front legs and the pair of back legs are located in a position suitable for supporting and providing mobility to the infant car seat. The infant car seat can function in a vehicle without detaching the infant car seat assembly from the infant car seat.

According to another aspect of the invention, a method of providing mobility to an infant car seat utilizes an infant car seat having at least two hubs that are secured to the infant car seat at connections therebetween and rotatable about the connections, a pair of front legs secured to the hubs at uppermost extents thereof and having at least two wheel assemblies secured to lowermost extents thereof, and a pair of rear legs secured to the hubs at uppermost extents thereof and having at least two wheel assemblies secured to lowermost extents thereof. The method includes rotatably locking the at least two hubs in at least a first locking position such that the pair of front legs and the pair of back legs are located in a position suitable for supporting and providing mobility to the infant car seat, providing mobility to the infant car seat with the infant car seat assembly, rotatably unlocking the at least two hubs from the first locking position, rotating the at least two hubs about the connections of the at least two hubs and the infant car seat such that the pair of front legs and the pair of rear legs rotate in the same direction relative to the infant car seat when the at least two hubs are rotated, and securing the infant car seat on a seat of a vehicle without detaching the infant car seat assembly from the infant car seat.

According to another aspect of the invention, an infant car seat assembly for providing mobility to an infant car seat includes at least two hubs configured to be releasably secured to the infant car seat, the at least two hubs being configured to rotate about connections between the at least two hubs and the infant car seat when the at least two hubs are secured to the infant car seat. The infant car seat assembly further includes a pair of front legs secured to the hubs at uppermost extents thereof and having at least two wheel assemblies secured to lowermost extents thereof, and a pair of rear legs secured to the hubs at uppermost extents thereof and having at least two wheel assemblies secured to lowermost extents thereof. At least one of the pair of front legs and the pair of rear legs are configured to pivot about an axis between the uppermost extents thereof within the at least two hubs. When the infant car seat assembly is releasably secured to the infant car seat, the infant car seat can function in a vehicle without detaching the infant car seat assembly from the infant car seat.

A technical effect of the invention is the ability of an infant car seat assembly to function as both a car seat and a stroller. In particular, it is believed that providing an assembly adapted to be secured to a commercially available car seat allows one to utilize the car seat and the assembly as a stroller. According to certain preferred embodiments, the infant car seat assembly is configured to be used as a car seat in a wide variety of vehicles, and/or releasably secured to a wide variety of car seats.

Other aspects and advantages of this invention will be better appreciated from the following detailed description.

BRIEF DESCRIPTION OF THE DRAWINGS

FIGS. 8-11 represent interior views of hubs of the car seat assembly of FIGS. 1-3 and show legs of the car seat assembly in a locked expanded position, an unlocked partially expanded position, a locked collapsed position, and an unlocked collapsed position, respectively.

DETAILED DESCRIPTION OF THE INVENTION

Figure 1:
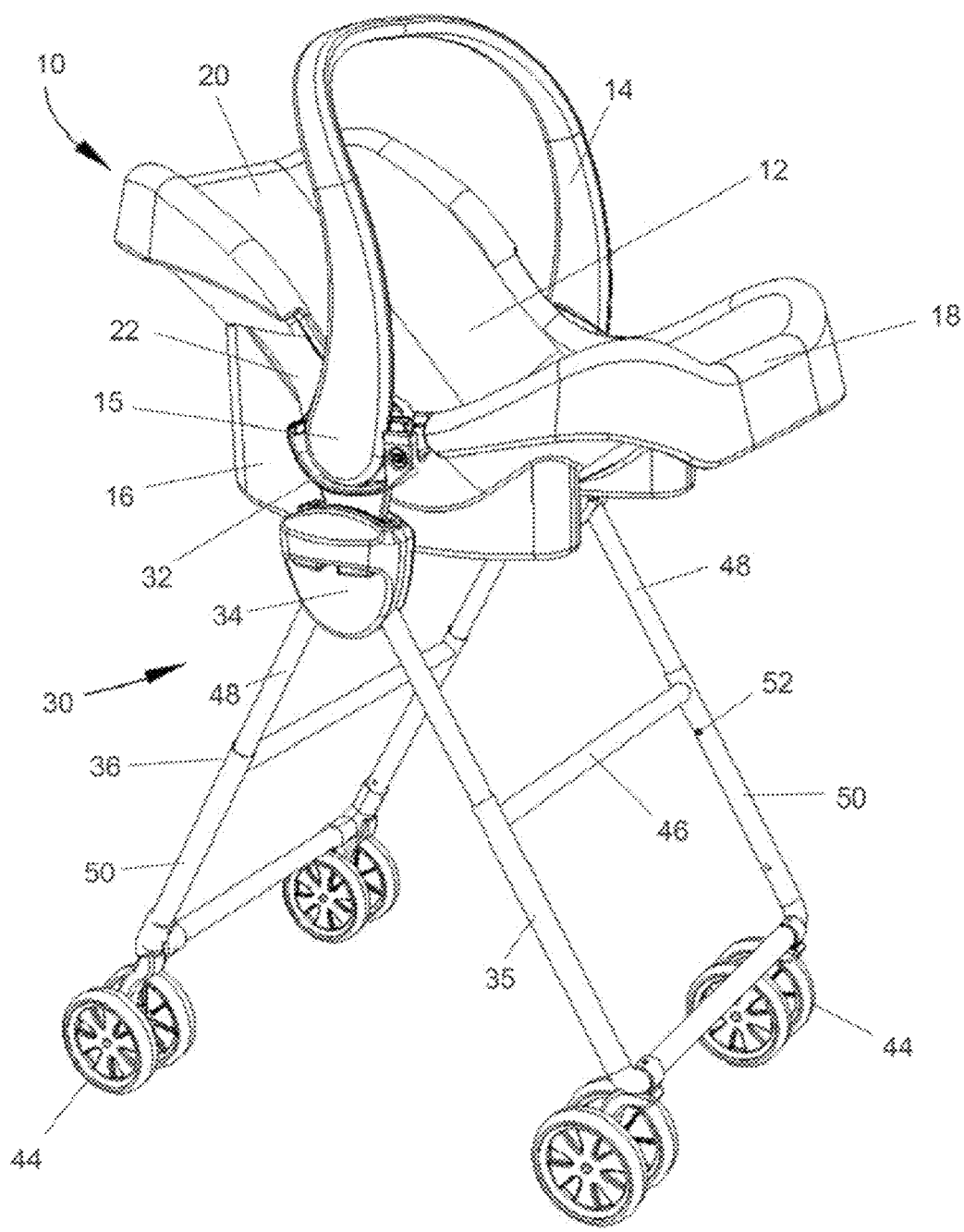
FIGS. 1-3 are front perspective, back perspective, and side views representing a car seat secured to a car seat assembly in accordance with an aspect of the present invention.
Figure 2:
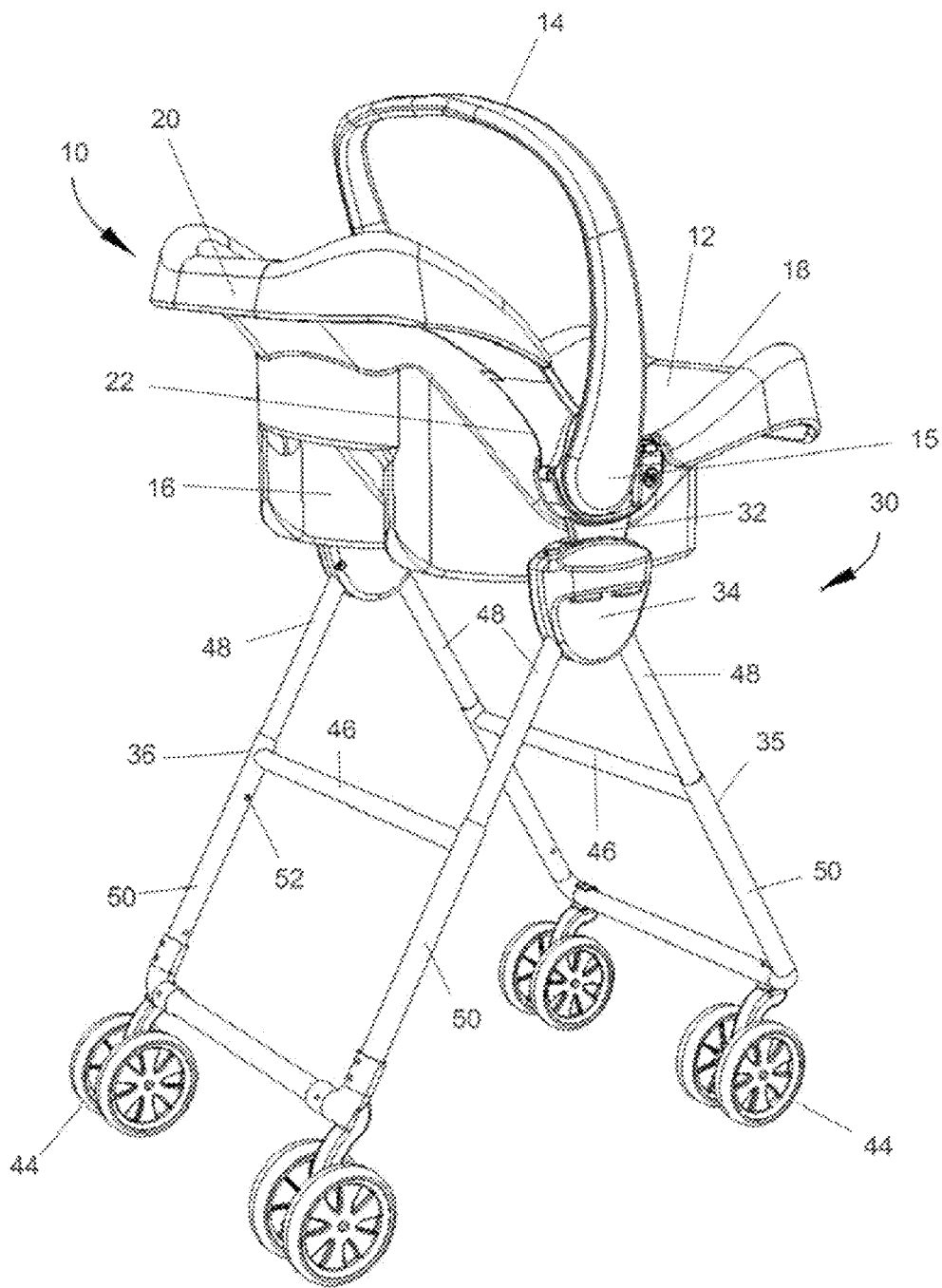
Figure 3:
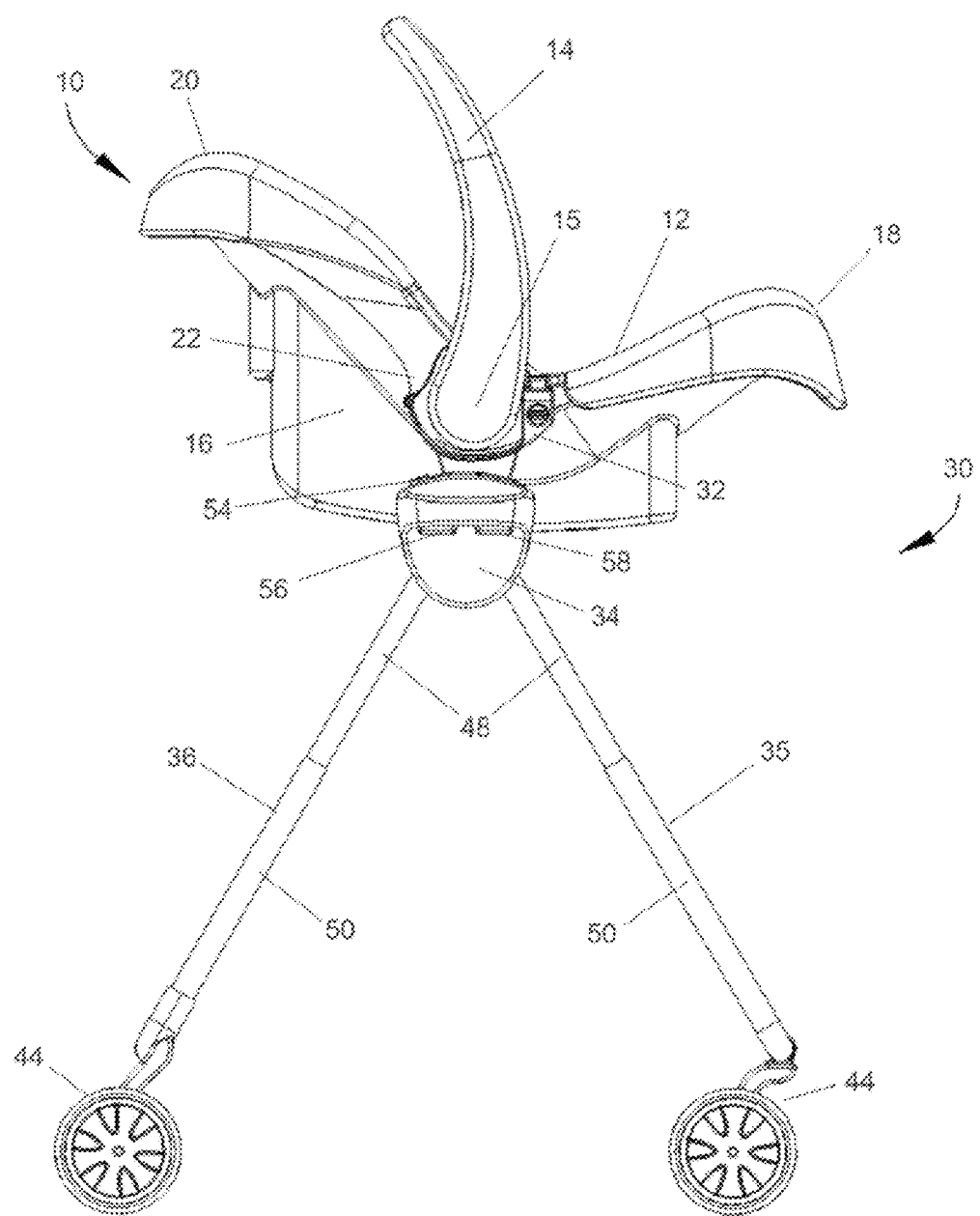

FIGS. 1-3 represent an infant car seat assembly 30 secured to a representative car seat 10 in accordance with an aspect of the present invention. The assembly 30 is intended to be a simple device which can be either added on to an infant car seat, such as the car seat 10, or built into and manufactured with an infant car seat. Generally, the apparatus will allow an infant car seat to function as an infant stroller. The assembly 30 may be used with any type car seat known in the art. The car seat 10 is represented as comprising a seat 12 on a base 16 including a rotating handle 14 rotatably secured to the car seat 10 at end portions 15 of the handle 14. To facilitate the description of the infant car seat assembly 30 provided below, the terms "vertical," "horizontal," "lateral," "front," "rear," "side," "forward," "rearward," "upper," "lower," "above," "below," "right," "left," etc., will be used in reference to the perspective of an infant seated in an attached car seat, wherein "front" refers to a leg rest end 18 of the car seat 10 and "rear" refers to a head rest end 20 of the car seat 10, and therefore are relative terms that indicate the construction, installation and use of the invention and therefore help to define the scope of the invention.

Figure 4:
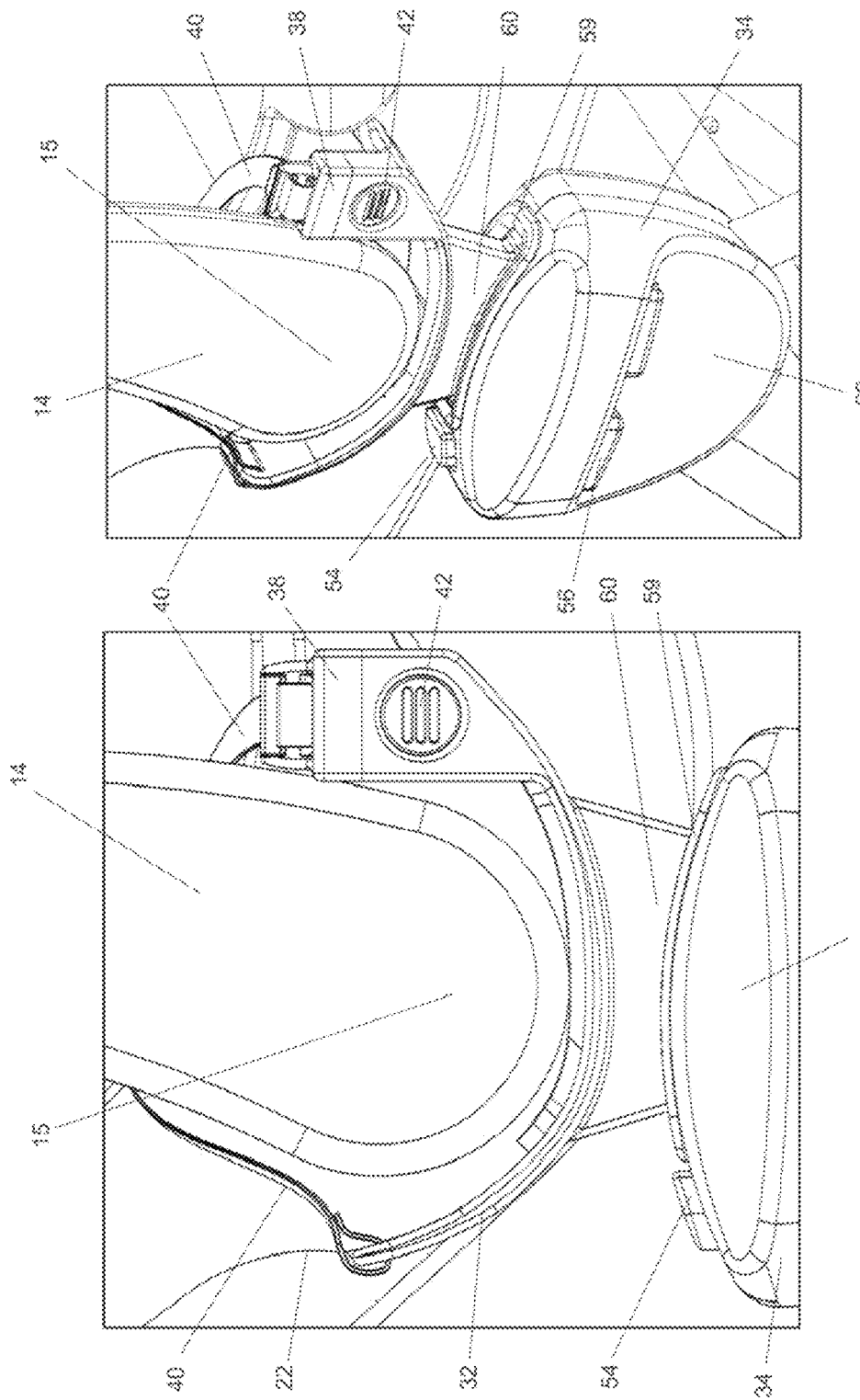
FIG. 4 represents side and perspective views of an adapter securing a hub of a car seat assembly to a car seat assembly in accordance with an aspect of the present invention.
Figure 5:
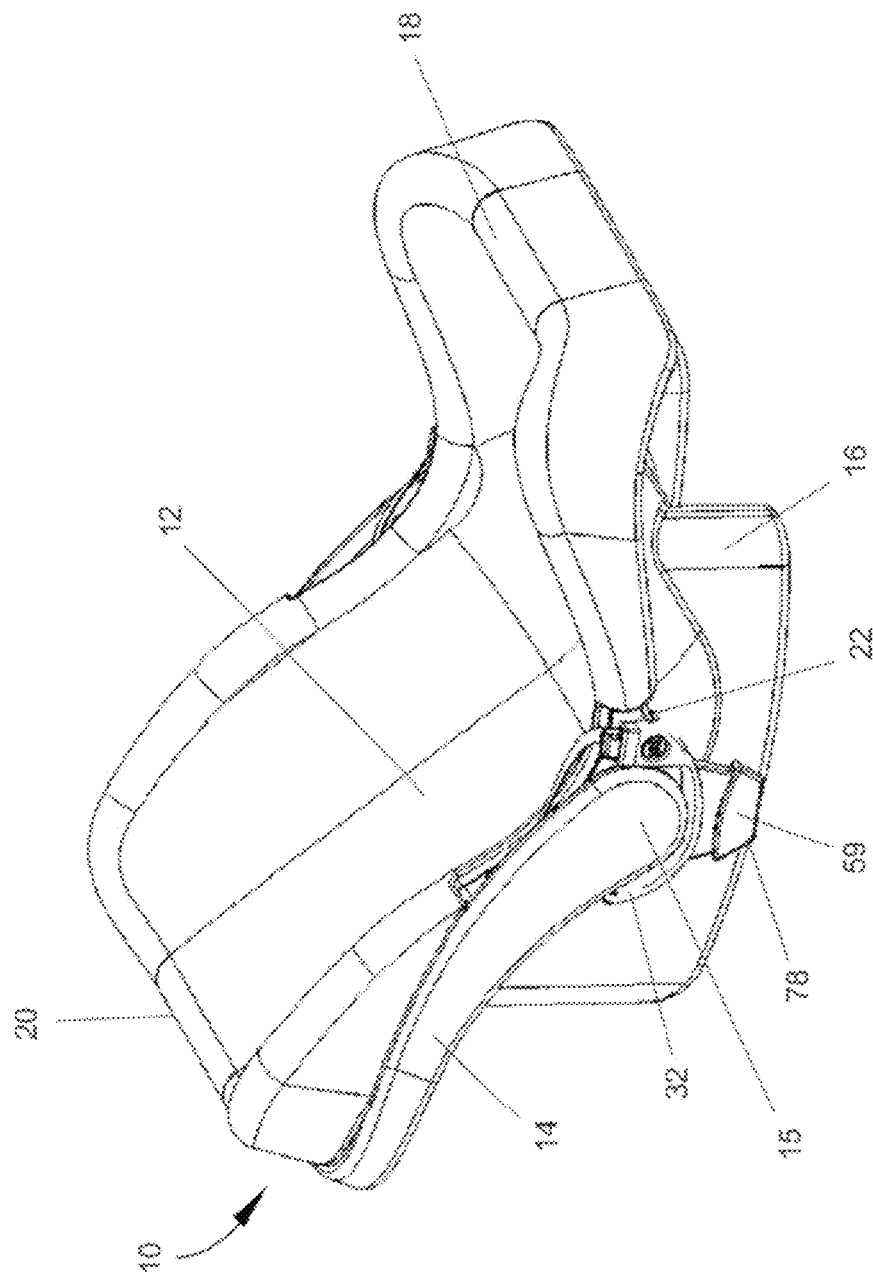
FIG. 5 is a perspective view representing a car seat secured to an adapter in accordance with an aspect of the present invention.
Figure 6:
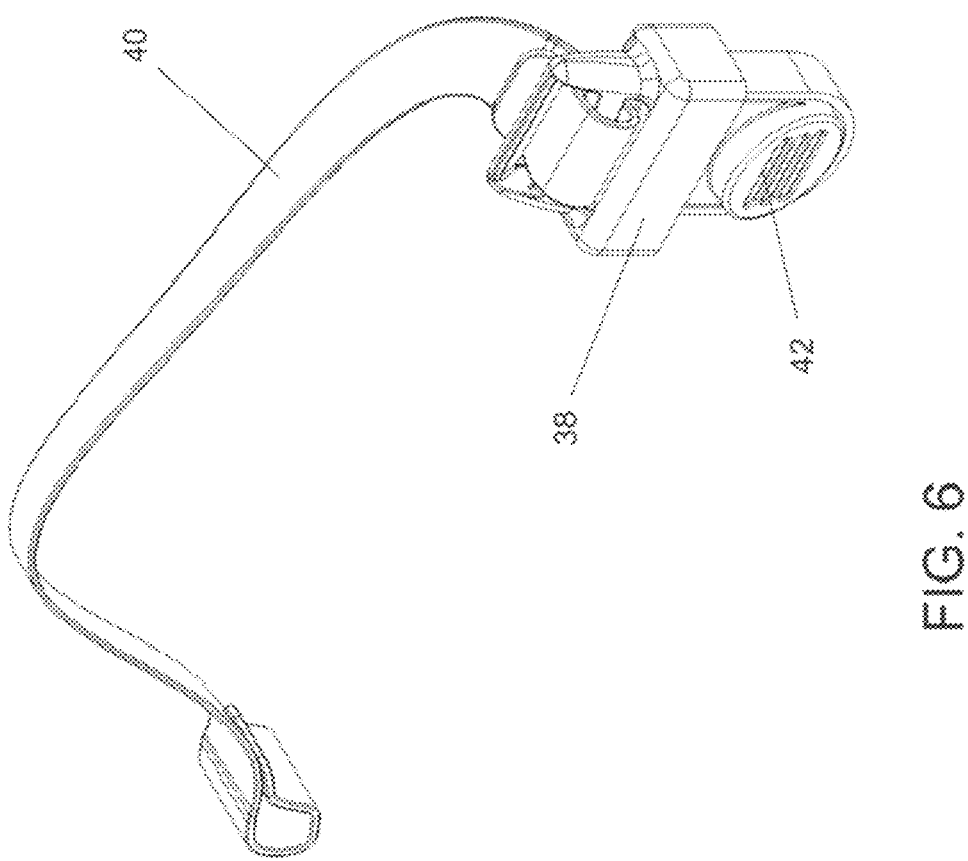
FIG. 6 is a perspective view representing a strap and a clip of the adapter of FIG. 5.

The assembly 30 comprises two hubs 34 and a pair of front legs 35 and a pair of rear legs 36 each secured to the hubs 34 at uppermost extents of each of the front and rear legs 35 and 36. The pair of front legs 35 and the pair of rear legs 36 each include at least two wheel assemblies 44 located at or adjacent lowermost extents of the front and rear legs 35 and 36. Two adapters 32 adapted to mate with the hubs 34 are utilized to releasably secure the assembly 30 to the car seat 10. Each of the adapters 32 may be releasably or permanently secured to the car seat 10 by any means known in the art. The adapters 32 are represented as partially encasing and securing to an edge 22 of the car seat 10 at a region below or adjacent to a lowermost extent (end portions 15) of the handle 14. Referring to FIG. 4, each adapter 32 includes a strap 40 secured to the adapters 32 on a first side of the handle 14 near the lowermost extent thereof. The strap 40 wraps around an interior side of the handle 14, and is releasably secured to the adapter 32 with a clip 38 on a second side of the handle 14. The clip 38 includes a button 42 for releasing the strap 40 from the second side of the adapter 32. The adapter 32 includes a male mating portion 60, represented in FIG. 5, sized and configured to releasably mate with a corresponding female mating portion 59 located on the hubs 34. Although the coupling of the adapters 32 and the hubs 34 are represented as previously described, any means of coupling the adapters 32 and hubs 34 known in the art may be utilized and therefore, the present invention should not be limited to the coupling means described herein and represented in the figures.

Figure 13A:
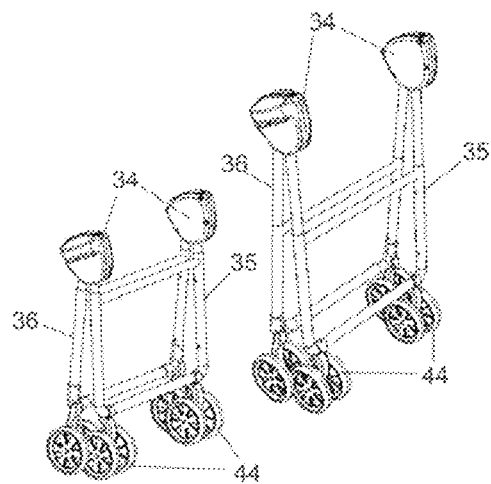
FIGS. 13A-13C represent steps carried out for assembling the car seat assembly and car seat of FIGS. 1-3.
Figure 13B:
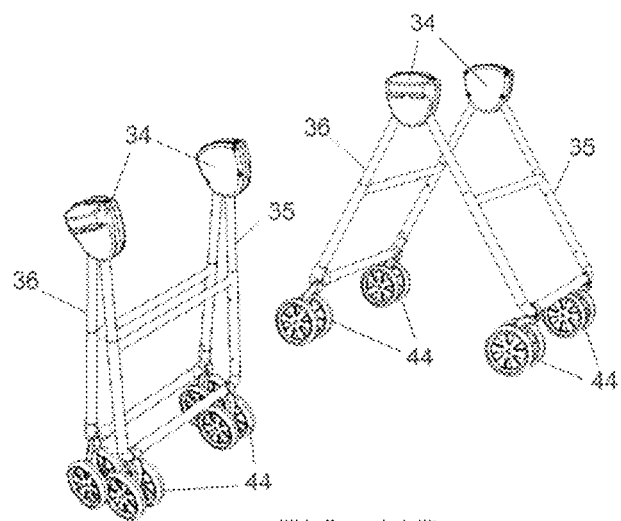
Figure 13C:
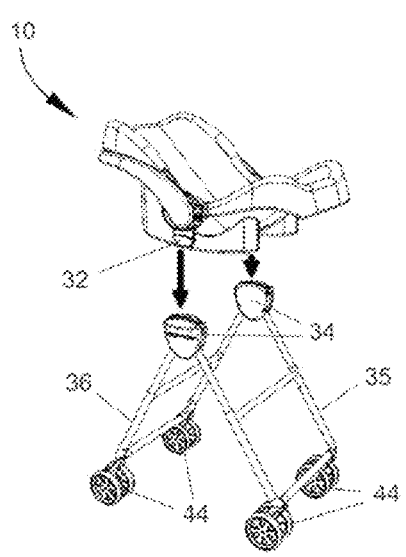

Preferably, the front and rear legs 35 and 36 are adapted to collapse and expand by rotating or pivoting at least one of the front or rear legs 35 and 36 about an axis between the uppermost extents of the front or rear legs 35 and 36 as represented in FIGS. 13A-13C. This configuration provides the assembly 30 with the capability to be in at least either a first position and a second position. The first position having the lowermost extents of the pair of front legs 35 at a minimum distance from the lowermost extents of the pair of rear legs 36 (collapsed) and the second position having the lowermost extents of the pair of front legs 35 at a maximum distance from the lowermost extents of the pair of rear legs 36 (expanded). The front and rear legs 35 and 36 are represented as expanded and collapsed in FIG. 13A. When deployed, the leg assemblies extend below the car seat 10, allowing the car seat 10 to function as a stroller. The front and rear legs 35 and 36 may be formed in any configuration known in the art that provides the car seat 10 and the assembly 30 to be in an upright and stable position when the front and rear legs 35 and 36 are in an expanded position. For example, FIGS. 1-3, and 7 represent the front legs 35 and the rear legs 36 as each being formed of two upper leg portions 48 and a single U-shaped lower leg portion 50 including a crossbar 46 connecting upper ends of the U-shaped lower leg portion 50.

Figure 7:
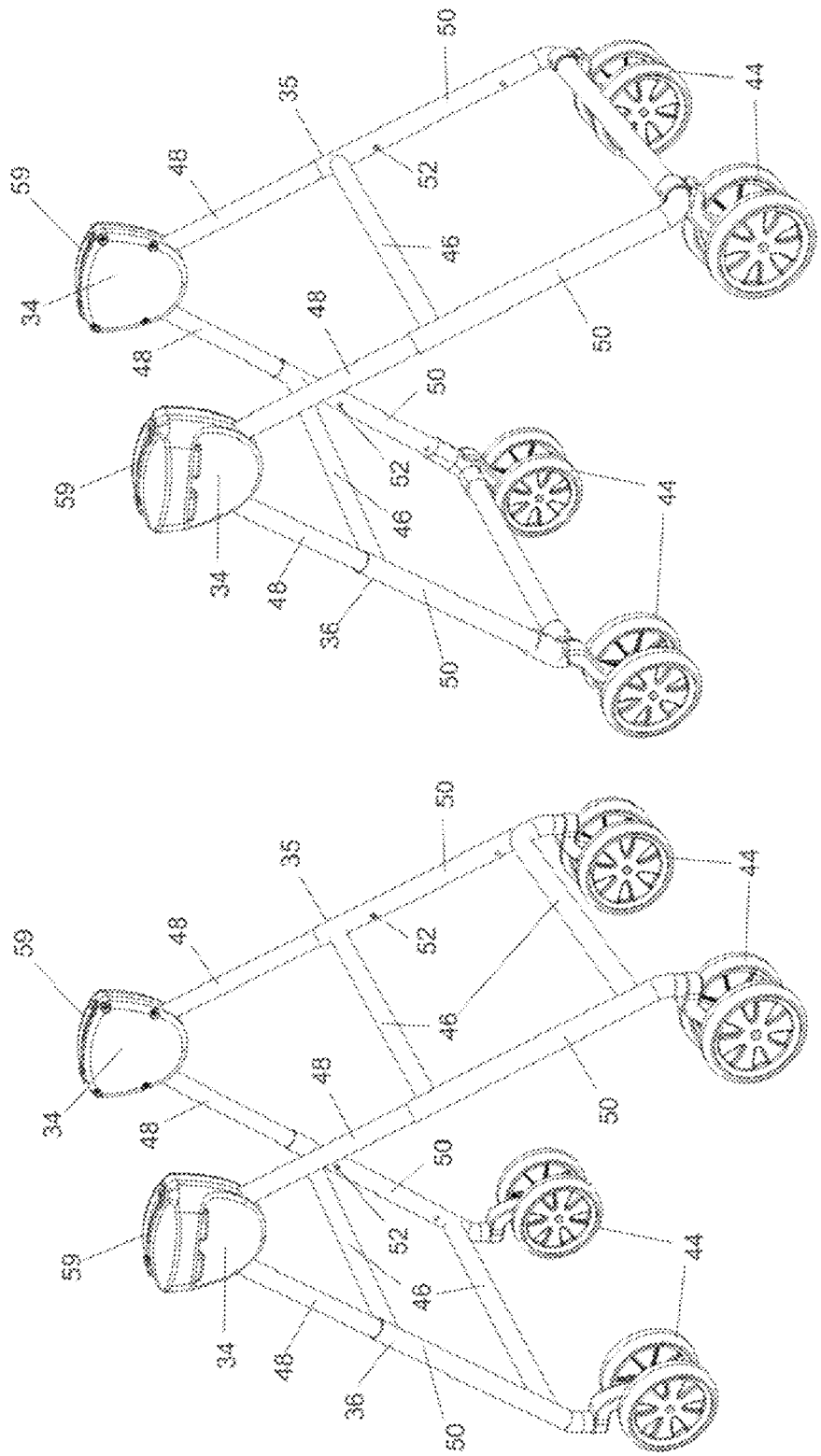
FIG. 7 includes perspective views representing various embodiments of legs of a car seat assembly in accordance with an aspect of the present invention.
Figure 9:
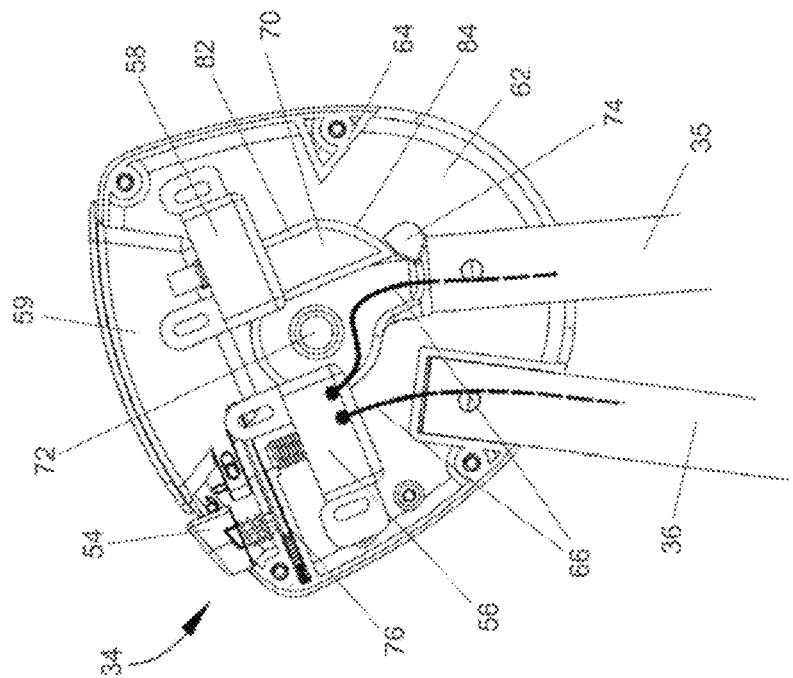

The front legs 35 and the rear legs 36 preferably telescope providing adjustment of the elevation of the car seat 10 above ground level. Therefore, the upper portions 48 are represented as being sized and configured to be inserted into the lower leg portion 50 providing the capability for retracting the upper leg portions 48 within the lower leg portions 50. The relative retracted position of the upper leg portions 48 within the lower leg portions 50 may be secured with pins 52 sized to protrude through holes formed along vertical portions of the low leg portions 50. Stated another way, the pair of front legs 35 and the pair of rear legs 36 are configured to retract to a minimum length and to expand to a maximum length and the length of the pair of front legs 35 and the pair of rear legs 36 are configured to be lockable at least at the maximum length. An alternative embodiment of the front and rear legs 35 and 36 is represented in FIG. 7 wherein the lower leg portions 50 are formed in an H-shape comprising two vertical portions and two crossbars 46 rather than the previously described U-shape. Wheel assemblies 44 are positioned adjacent at lower most and preferably outermost extents of the lower leg portions 50 to provide stable mobility and allow the car seat 10 and assembly 30 to function as a stroller.

As previously stated, the hubs 34 of the assembly 30 are adapted to secure and position front and rear legs 35 and 36 and further adapted to be secured to the car seat 10 with the adapters 32. The hubs 34 include the previously described female mating portion 60, means for locking and releasing the male mating portion 59 of the adapter 32, means for rotating and securing at least one of the front legs 35 and rear legs 36, and means for controlling the retraction and extension of the front legs 35 and rear legs 36, all within a housing 62.

According to a preferred embodiment of the present invention, the hubs 34 are represented in FIGS. 8-11 as comprising an adapter release button 54, a telescope release button 56, and a leg lock release button 58. Upon insertion of the male mating portion 60 of the adapter 32 into the female mating portion 59 of the hub 34, the male mating portion 60 preferably is locked or secured with a tab, bar and/or locking pin 76 that is inserted into a cavity 78 (represented in FIG. 5) formed on the male mating portion 59 of the adapter 32. The locking pin 76 is preferably beveled to allow the male mating portion 60 to be inserted without pressing the adapter release button 54. By pressing the adapter release button 54 downward, the locking pin 76 is preferably forced from the cavity 78 releasing the male mating portion 60.

Figure 12:
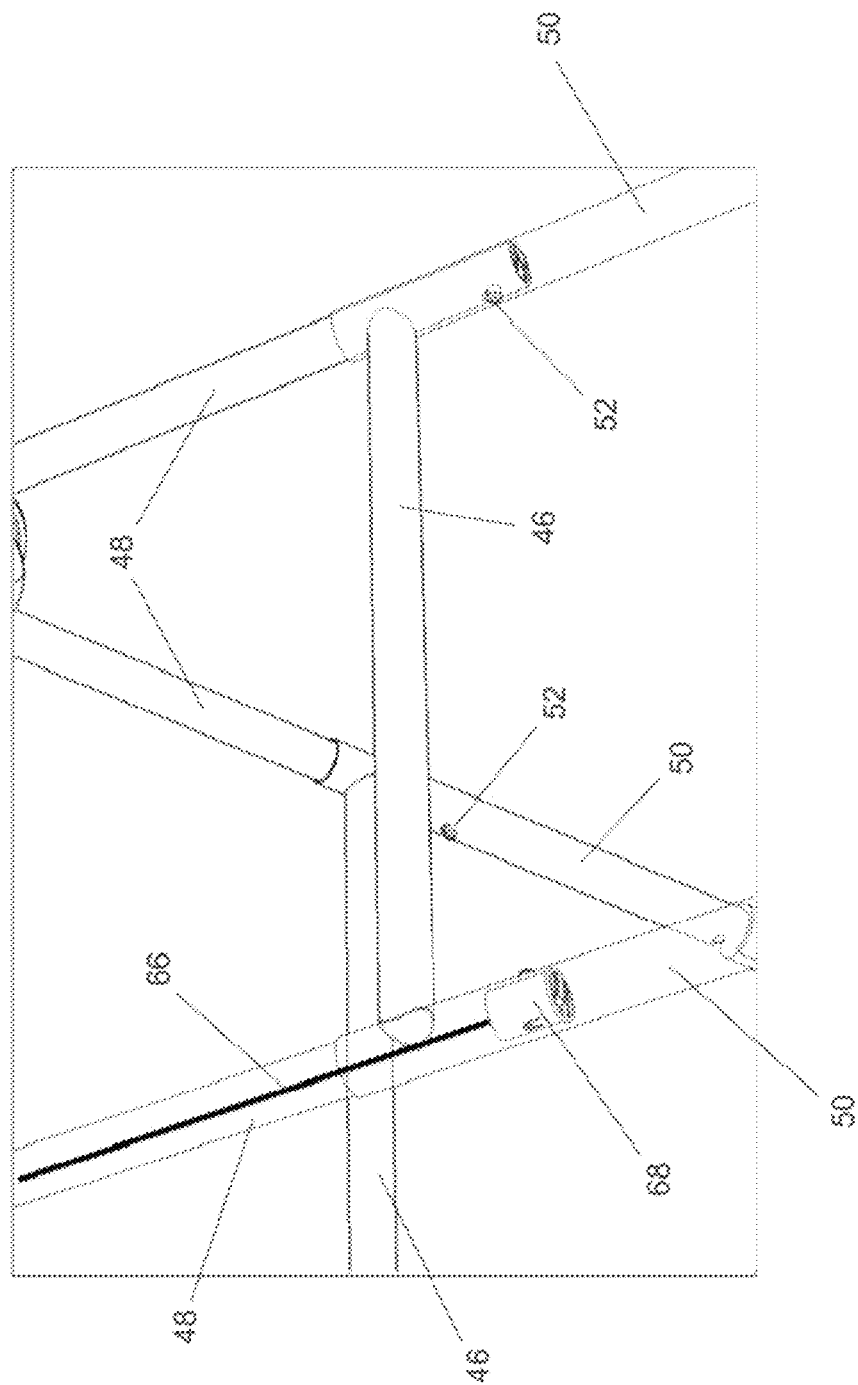
FIG. 12 is a perspective view with partial cutaways showing interior portions of the legs of the car seat assembly of FIGS. 1-3.

The telescope release button 56 is connected to wires 66 that couple the telescope release button 56 with internal leg height lock mechanisms 68 (represented in FIG. 12) comprising the pins 52. By pressing the telescope release button 56 upward, the wires 66 act upon the lock mechanisms 68 to retract the pins 52 into an internal cavity of the lower leg portions 50 allowing the upper leg portions 48 to retract within the lower leg portions 50.

Figure 8:
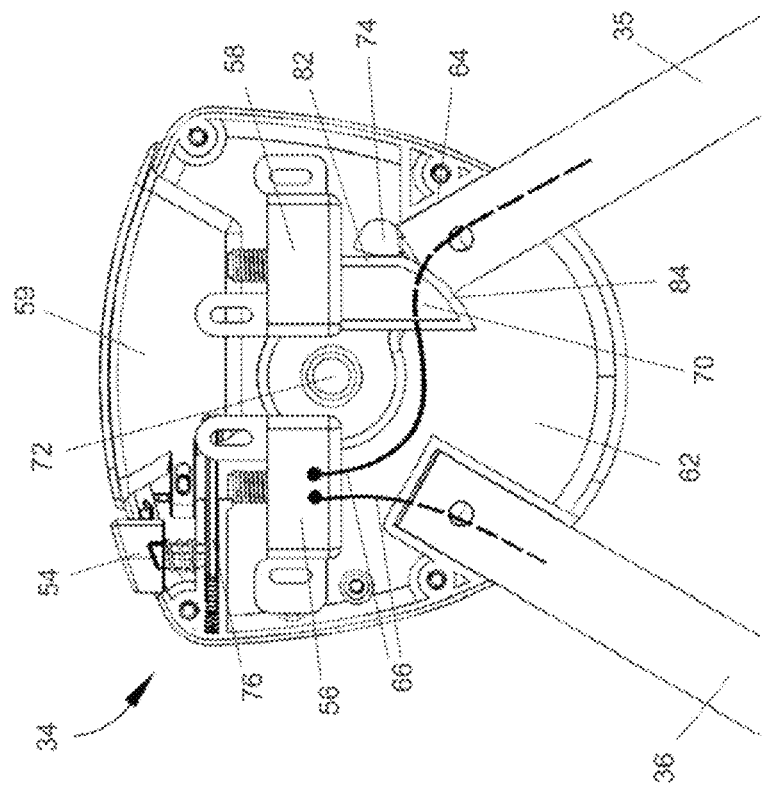

The leg lock release button 58 includes a rotation locking member 70 having a vertical portion 82 and a curved portion 84. The front legs 35 are adapted to pivot about an axis of an axle member 72 to switch between an expanded position and a collapsed position. In the expanded position, a locking nub 74 secured to the axle member 72 is secured between the vertical portion 82 of the locking member 70 and a brace 64 of the housing 62 thereby locking and securing the position of the front legs 35, as represented in FIG. 8. By pressing the leg lock release button 58 upwards, the locking nub 74 is released and rotatably slides along the curved portion 84 of the locking member 70 until meeting the rear legs 36 in the a locked collapsed position, represented in FIG. 10.

In operation, the adapters 32 are preferably kept attached to the car seat 10 with the straps 40 to provide easy transition between car seat and stroller functions. To transition to function as a stroller, the telescope release button 56 may be pressed to extend the telescoping front and rear legs 35 and 36 as represented in FIG. 13A. The leg lock release button 58 may then be pressed to pivot and reposition the front and rear legs 35 and 36 from the collapsed position to the locked expanded position, as represented in FIG. 13B. The car seat 10 may then be lowered onto the assembly 30 securing the adapters 32 into the hubs 34, as represented in FIG. 13C. The weight of the car seat 10 rests on the adapters 32 and is supported by the assembly 30. One may then operate the car seat 10 and assembly 30 as a stroller by pushing on the handle 14 of the car seat 10. To transition to function as a car seat, the adapter release button 54 is pushed to release the car seat 10 from the hub 34 and the car seat 10 with the attached adapters 32 may be placed in the vehicle. The telescope release button 56 and the leg lock release button 58 may be pressed to retract the telescoping front and rear legs 35 and 36 and pivot and reposition the front and rear legs 35 and 36 from the extended and expanded position to the retracted and collapsed position for storage in the vehicle.

Figure 14:
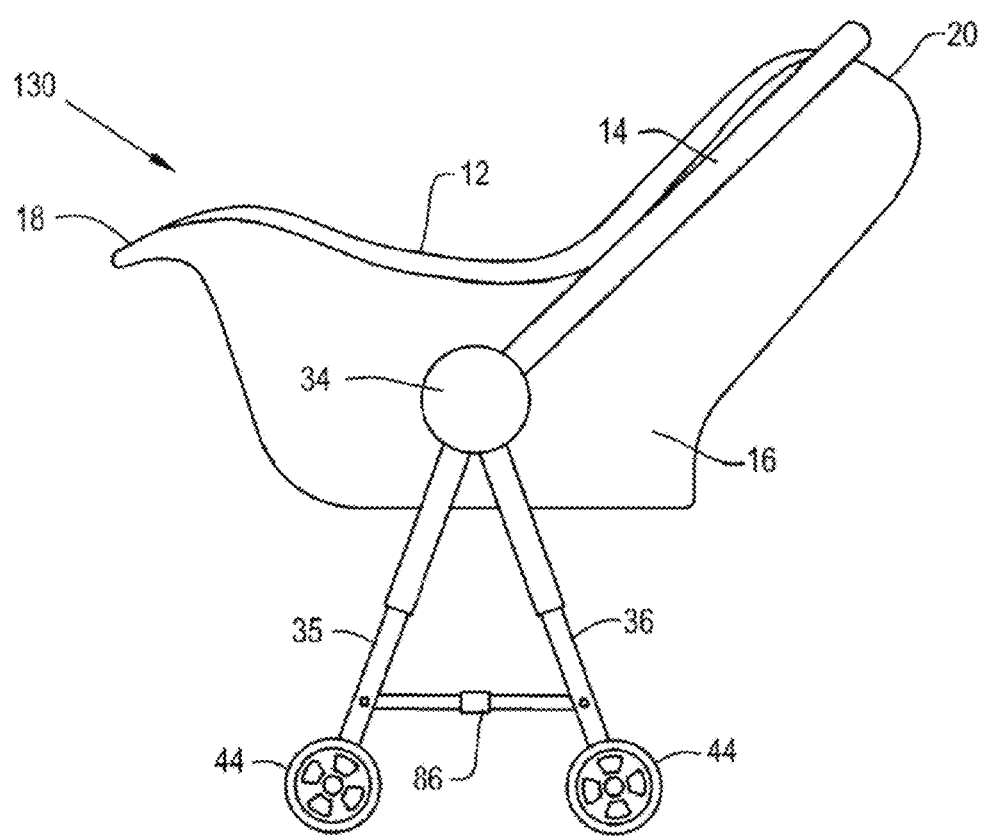
FIGS. 14 and 15 are side views representing a car seat secured to a car seat assembly in accordance with an aspect of the present invention.
Figure 15:
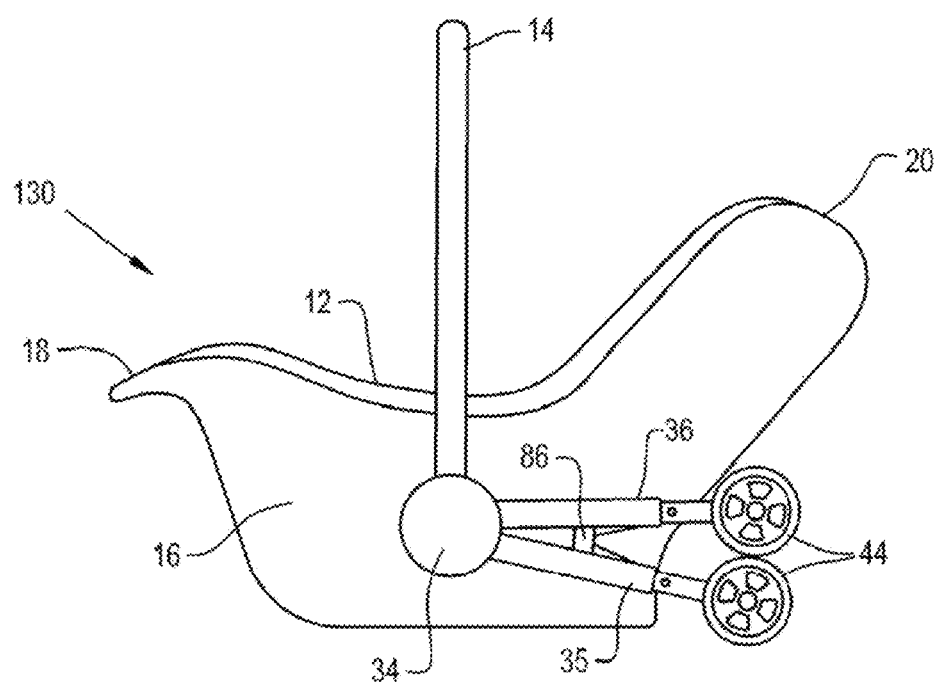

FIGS. 14 and 15 represent a second embodiment of the present invention. As represented, the infant car seat assembly 130 comprise substantially similar components to the embodiment of FIGS. 1-13 including the hub 34, front legs 35, rear legs 36, and wheel assemblies 44. The assembly 130 is adapted to allow the car seat 10 to be inserted into the vehicle and utilized as the car seat 10 without removing the assembly 130 from the car seat 10. Consequently, the adapters 32 are an optional feature of this embodiment. If the adapters 32 are omitted, the hubs 34 may be adapted to be releasably or permanently secured to the car seat 10 by any known means including those described for the adapters 32 in FIGS. 1-13. In addition, the assembly 130 is represented in FIG. 14 as comprising an optional collapsible bar 86 further supporting the assembly 130 by connecting the front legs 35 to the rear legs 36.

In contrast to the embodiments of FIGS. 1-13, both the front legs 35 and the rear legs 36 of the assembly 130 are adapted to pivot in unison within the hub 34 about uppermost extents of the front legs 35 and the rear legs 36, respectively. Preferably, the leg lock release button 58 is adapted to simultaneously release both the front legs 35 and the rear legs 36 allowing them to pivot in unison. Preferably, the front and rear legs 35 and 36 may be positioned in either an expanded position with the front and rear legs 35 and 36 extended, as represented in FIG. 14 and similar to that of FIG. 1-3, or a collapsed position with the front and rear legs 35 and 36 retracted as represented in FIG. 15. By positioning the assembly 130 in a locked and collapsed position above the lowermost extent of the base 16 of the car seat 10, the car seat 10 may be used for its intended purpose in a vehicle without requiring the removal of the assembly 130. In operation, the assembly 130 performs in a substantially similar manner as described above for assembly 30, but without the steps of securing and/or releasing the assembly 130 when switching between car seat and stroller functions.

Figure 16:
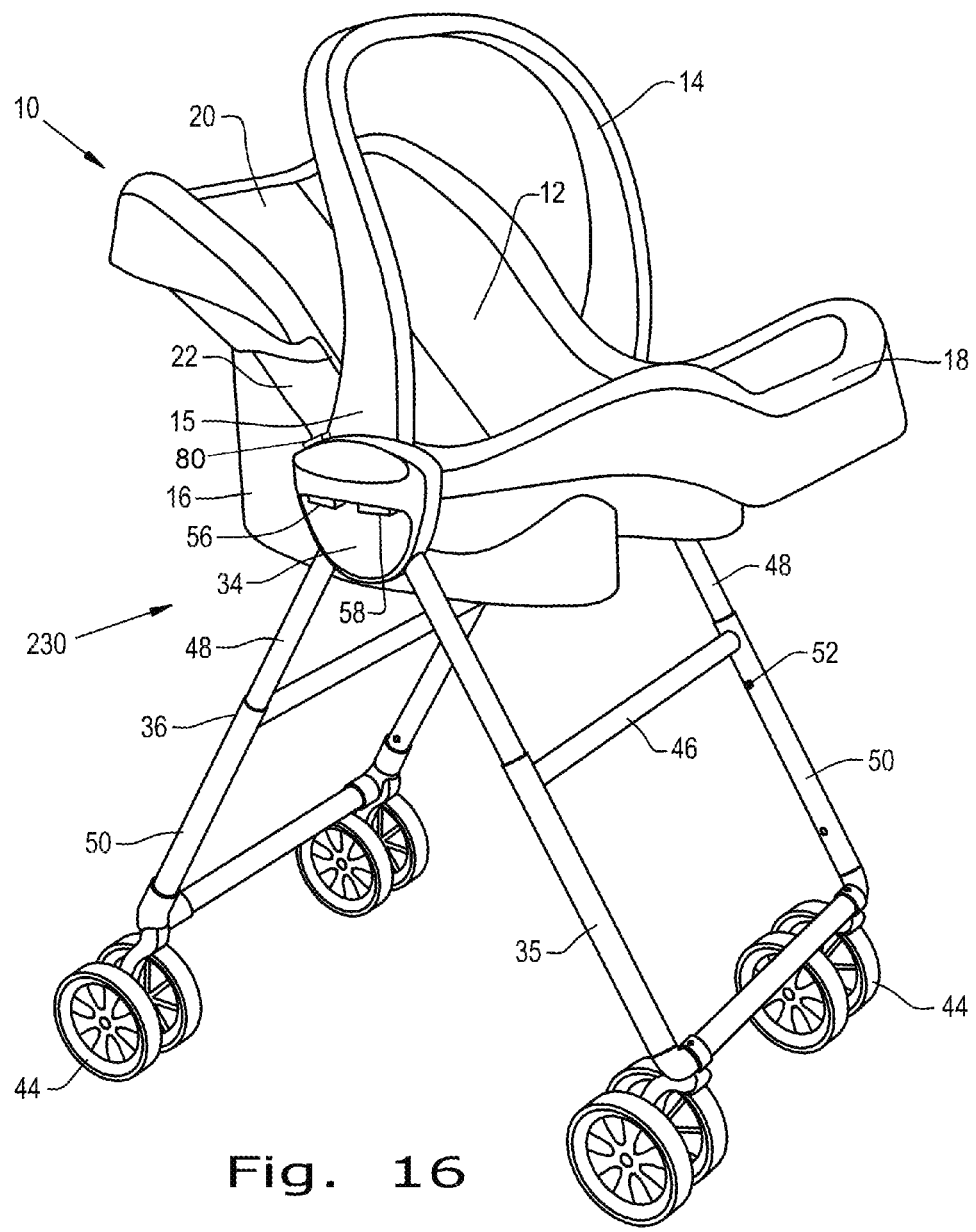
FIGS. 16-18 represent a car seat secured to an infant car seat assembly in accordance with an aspect of the present invention.
Figure 17:
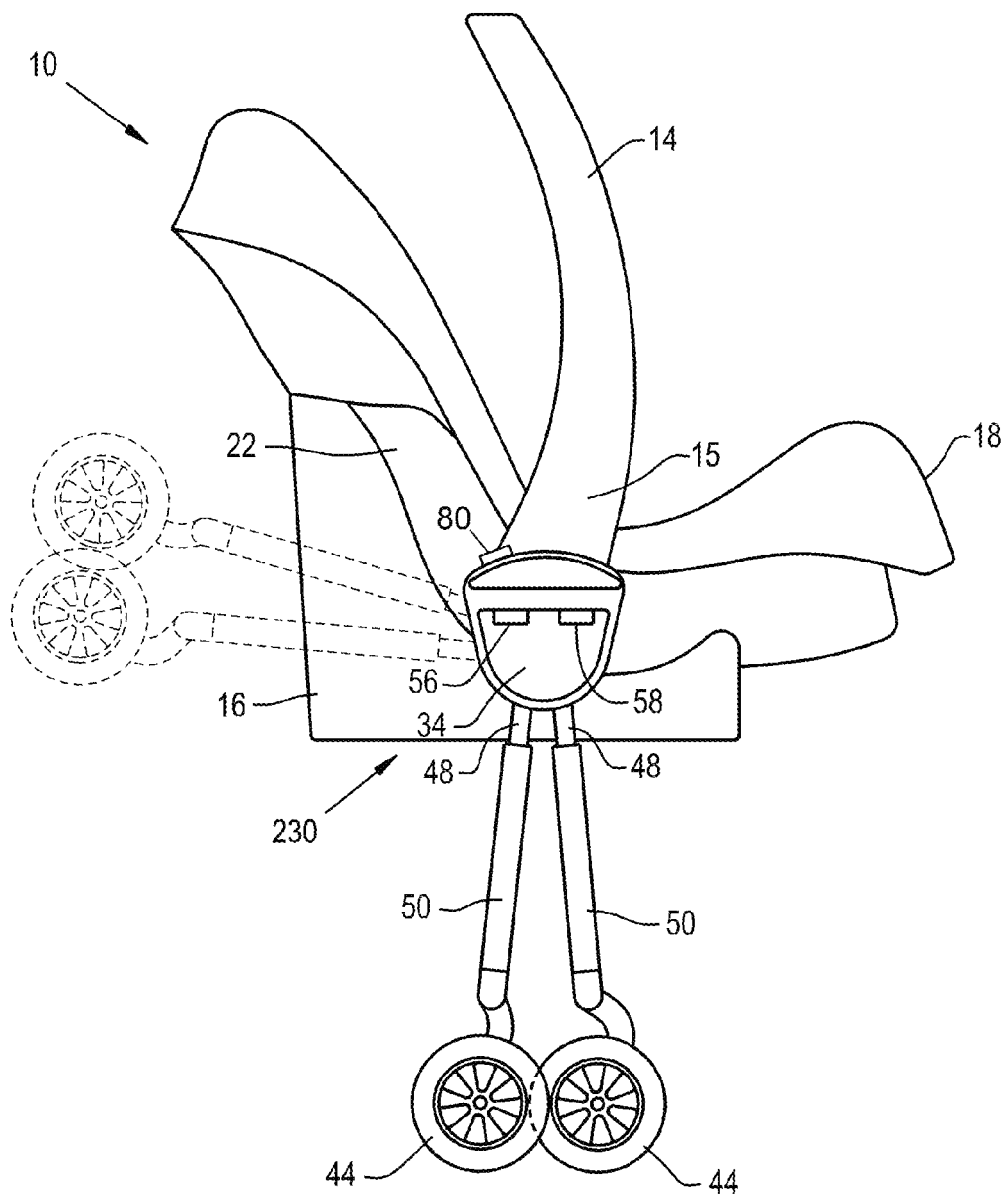
Figure 18:
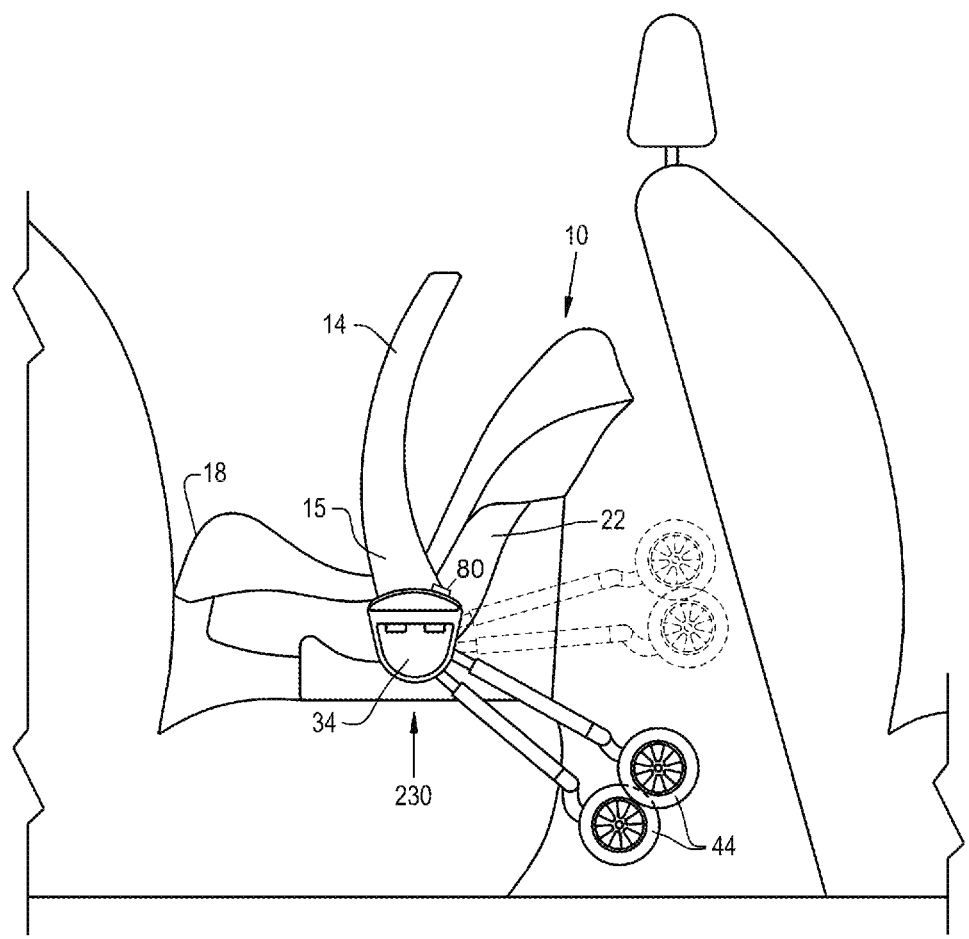
Figure 19:
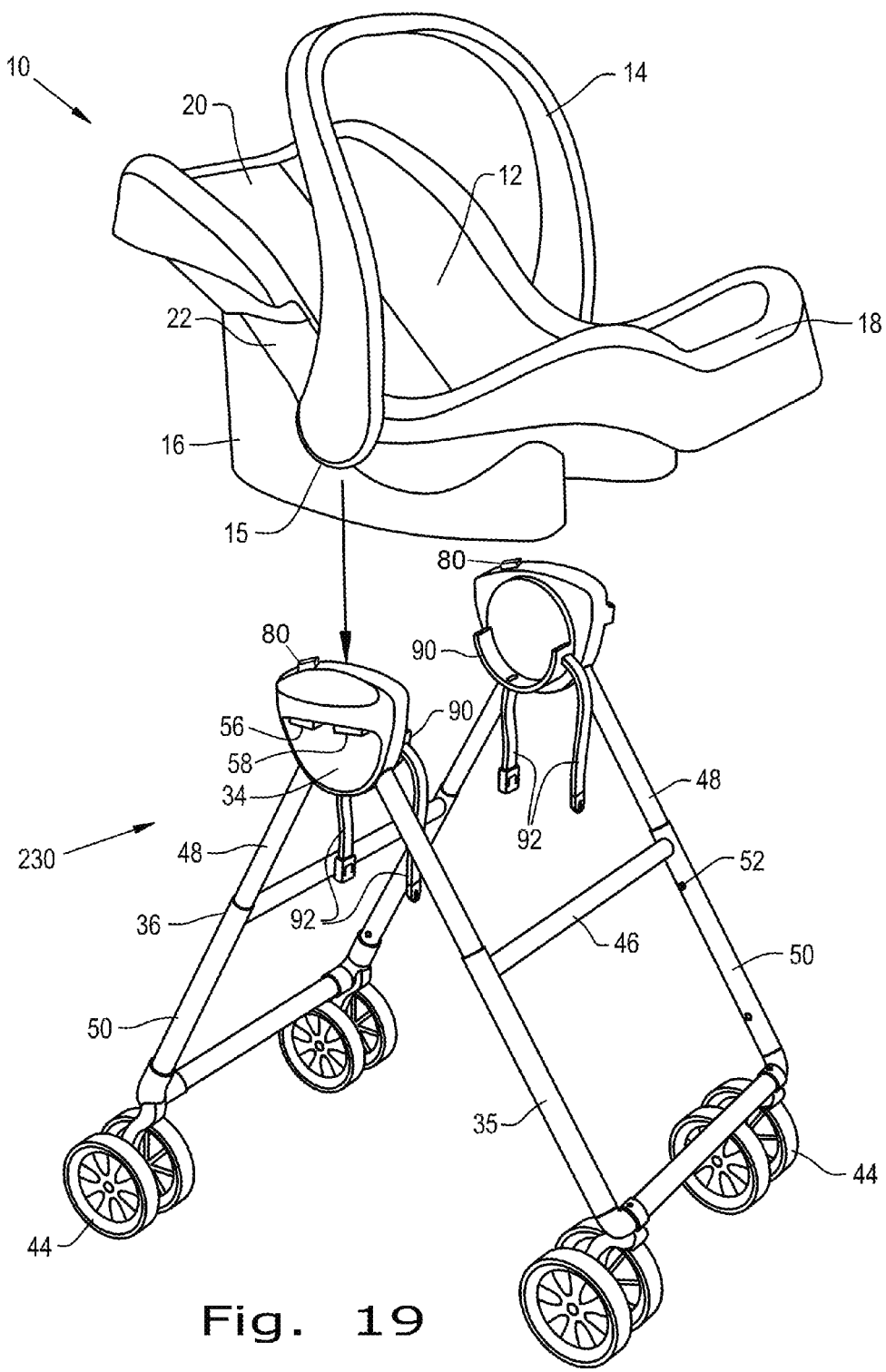
FIG. 19 represents an infant car seat assembly suitable for releasably securing to a car seat in accordance with an aspect of the present invention.
Figure 20:
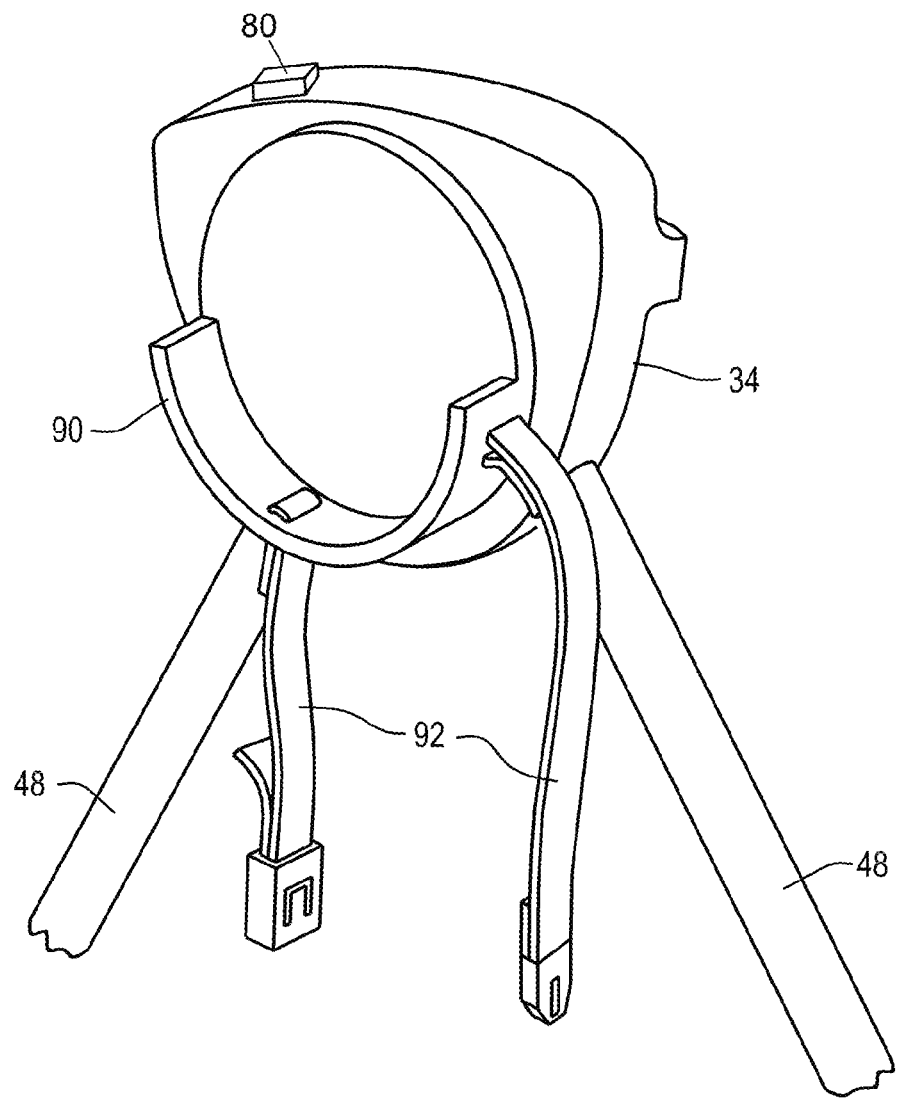
FIG. 20 represents a connector of the seat assembly of FIG. 19.

FIGS. 16 through 18 represent another embodiment of the present invention. Notably, FIGS. 16 through 20 depict additional configurations of the infant car seat assembly in accordance with further embodiments of this invention. In these figures, consistent reference numbers are used to identify the same or functionally equivalent elements. As represented, an infant car seat assembly 230 comprising the hubs 34 rotatably coupled to the car seat 10 at the end portions 15 of the car sear handle 14. The assembly 230 may be permanently secured or releasably secured to the handle 14. For example, FIGS. 16 through 18 represent the hubs 34 as permanently secured to the handle 14 whereas FIGS. 19 and 20 represent an embodiment configured for releasably securing the hubs 34 to the car seat 10. The assembly 200 comprises substantially similar components to the embodiment of FIGS. 1-15 including the hubs 34, front legs 35, rear legs 36, and wheel assemblies 44. The assembly 230 is adapted to allow the car seat 10 to be inserted into the vehicle, secured to a seat of the vehicle, and provide conventional car seat functionality without removing the assembly 230 from the car seat 10.

In the embodiments represented in FIGS. 16 through 18, the hubs 34 comprise the telescope release button 56, the leg lock release button 58, and a car seat assembly rotation button 80. The telescope release button 56 preferably functions in substantially the same manner as described in reference to FIGS. 1 through 13. The leg lock release button 58 is adapted to release one of the front or rear legs 35 and 36, or simultaneously release both the front legs 35 and the rear legs 36 allowing them to pivot in unison such that the front and/or rear legs 35 and 36 pivot about the axis of their respective axle members 72 to switch between an expanded position and a collapsed position. FIG. 17 represents both the front and rear legs 35 and 36 pivoted in directions towards one another such that the legs 35 and 36 are in a collapsed position directly below the hubs 34.

The assembly rotation button 80 is configured to rotatably release the hubs 34 such that the assembly 230 may pivot at a connection to the car seat 10 and rotate relative to the body of the car seat 10. According to an aspect of the invention, the assembly rotation button 80 may be configured to release the hubs 34 from one or more locking positions. For example, the assembly 230 may be locked in a first position as represented in FIG. 16 such that the legs 35 and 36 may be used for supporting the car seat 10. After the legs 35 and 36 have been collapsed and retracted with the leg lock release button 58 and the telescope release button 56, respectively, the assembly rotation button 80 may be pressed to release the hubs 34 and the assembly 230 may be pivoted at the hubs 34 until the assembly 230 reaches a second position in which the hubs 34 are locked. If additional locking positions exist, the assembly rotation button 80 may be pressed again, held down, or activated in some other manner to release the hubs 34 and the assembly 230 may be pivoted further until the assembly reaches a third locking position. It is foreseeable that the assembly 230 may be configured to lock in any position about the body of the car seat 10.

The assembly 230 as attached to the car seat 10 is configured to be used in a vehicle in a manner substantially similar to conventional infant car seats known in the art. For example, the car seat 10 may be secured to a rear seat of a vehicle such that the head rest end 20 of the car seat 10 is facing a front of the vehicle and the leg rest end 18 is facing a rear of the vehicle. FIG. 18 represents the assembly 230 locked in a locking position such that the legs 35 and 36 are directed at a downward angle relative to the car seat 10. In such configuration, once the car seat 10 has been secured to the rear seat as described above, the legs 35 and 36 are preferably located between a front side of the rear seat on which the car seat 10 rests and a back side of a front seat directly in front of the car seat 10. As such, the legs 35 and 36 are located in a position at which a passenger sitting in the rear seat would generally locate their legs. FIG. 18 further represents in phantom lines the assembly 230 locked in another locked position such that the legs 35 and 36 rest in a substantially horizontal position (relative to the base 16 of the car seat 10) and above the base 16 of the car seat 10 similar to the configuration represented in FIG. 15. In this configuration, the car seat 10 may be secured to the rear seat of the vehicle with the legs 35 and 36 extending in a direction towards the front seat directly in front of the car seat 10. The locking positions represented in FIGS. 16 through 18 are nonlimiting as the assembly 230 may be configured to lock in any position suitable for using the car seat 10 in a vehicle without decoupling the assembly 230 from the car seat 10. For example, it is within the scope of the invention that the hubs 34 are configured such that the legs 35 and 36 are not capable of rotating above the base 16 of the car seat 10. Preferably, the assembly 230 includes multiple locking positions such that the assembly 230 may be used in a wide variety of vehicles, regardless of the amount of space provided between seats of a specific vehicle. Alternatively, the assembly 230 may include a single locking position suitable for supporting the car seat 10 during operation as a stroller, and the assembly 230 may rotate freely when unlocked from the locking position. Such an embodiment may be preferred to allow the legs 35 and 36 to be more easily located in the passenger leg area (between a front side of the rear seat on which the car seat 10 rests and a back side of a front seat directly in front of the car seat 10) for a wide variety of vehicles which may require the legs to be located at a different angle depending on factors such as the size of the vehicle, the location of the seats, and other obstacles within the vehicle.

FIGS. 19 and 20 represent a configuration suitable for releasably securing the hubs 34 to the car seat 10. As represented, the hubs 34 comprise connectors 90 rotatably secured to an inner surface of each of the hubs 34. The connectors 90 may be configured to releasably secure to the car seat 10 in substantially the same manner as the adapters 32 of FIGS. 1-13, that is, the connectors 90 may be configured to partially encase and secure to the edge 22 of the car seat 10 at a region below or adjacent to the lowermost extent (end portions 15) of the handle 14. Alternatively, the connectors 90 may be configured to releasably secure to a lowermost end of the handles 14. Although the FIGS. 19 and 20 represent the connectors 90 as sized and shaped to encase or enclose a portion of the handle 14, it is foreseeable and within the scope of the invention that the connectors 90 may be releasably secured to the car seat 10 by any known means, and therefore are not limited to any specific size, shape, or type. Each connector 90 may include a strap 92 configured to wrap around an interior side of the handle 14, and thereby releasably secure the assembly 230 to the car seat 10. Once the connectors 90 are secured to the car seat 10, the assembly 230 may operate as described above in regards to FIGS. 16 through 18. Preferably, the connectors 90 are rotatably secured to the hubs 34 such that when the assembly 230 is pivoted at the hubs 34, the connectors 90 may remain stationary with the body of the car seat 10. Although the connectors 90 are represented as being secured to the car seat 10 with straps 92, any securing means known in the art, such as but not limited to a snap on mechanism integrated into either the car seat 10, the connectors 90, or both, are within the scope of the present invention.

In the embodiments represented in FIGS. 16 through 20, the legs 35 and/or 36 may be formed to have shapes suitable for promoting the assembly 230 being pivoted about the body of the car seat 10. For example, the upper leg portions 48, the lower leg portion(s) 50, and/or the crossbar 46 may comprise curves (not shown) such that the assembly 230 may be pivoted about the body of the car seat 10 without the legs 35 and/or 36 being restricted by the body of the car seat 10.

The embodiments described herein may further be modified to include features known in the art of infant appliances. For example, one or both of the hubs 34 may comprise a vibration device (not shown) suitable for causing the car seat 10 to vibrate when secured to the assembly 230, similar to known baby chairs and swings which vibrate in order to calm the infant and encourage sleep. As another example, the hubs 34 and/or the connectors 90 may be configured to provide the ability to cause the car seat 10 to swing or rock while the car seat 10 is secured to the assembly 230, similar to known baby swings which rock back and forth to calm a child and encourage sleep. In such situations, the hubs 34 may comprise one or more additional buttons, switches, or sensors (not shown) suitable for activating and/or deactivating these additional features.

While the invention has been described in terms of specific embodiments, it is apparent that other forms could be adopted by one skilled in the art. For example, the physical configuration of the front and rear legs 35 and 36, adapter 32, hub 34, and connector 90 could differ from that shown. Therefore, the scope of the invention is to be limited only by the following claims.

The invention claimed is:

1. An infant car seat assembly for providing mobility to an infant car seat, the infant car seat assembly comprising:
    at least two hubs configured to be secured to the infant car seat at connections therebetween and configured to rotate about the connections when the at least two hubs are secured to the infant car seat;
    a pair of front legs secured to the hubs at uppermost extents thereof and having at least two wheel assemblies secured to lowermost extents thereof;
    a pair of rear legs secured to the hubs at uppermost extents thereof and having at least two wheel assemblies secured to lowermost extents thereof;
    wherein at least one of the pair of front legs and the pair of rear legs are configured to pivot about an axis between the uppermost extents thereof within the at least two hubs;
    wherein the pair of front legs and the pair of rear legs are configured to be rotated in the same direction relative to the infant car seat when the at least two hubs are rotated about the connections between the at least two hubs and the infant car seat when the at least two hubs are secured to the infant car seat;
    wherein the at least two hubs are configured to rotatably lock in at least a first locking position such that the pair of front legs and the pair of back legs are located in a position suitable for supporting and providing mobility to the infant car seat;
    wherein the infant car seat can function in a vehicle without detaching the infant car seat assembly from the infant car seat.

2. The infant car seat assembly of claim 1, wherein the at least two hubs are permanently fixed to the infant car seat.

3. The infant car seat assembly of claim 1, wherein the at least two hubs are configured to be releasably secured to the infant car seat.

4. The infant car seat assembly of claim 1, wherein the at least one of the pair of front legs and the pair of rear legs pivot about an axis thereof such that the infant car seat assembly includes at least a first position and a second position, the first position locating the lowermost extents of the pair of front legs at a minimum distance from the lowermost extents of the pair of rear legs, the second position locating the lowermost extents of the pair of front legs at a maximum distance from the lowermost extents of the pair of rear legs, wherein the infant car seat assembly is configured to be locked in at least the second position.

5. The infant car seat assembly of claim 1, wherein the pair of front legs and the pair of rear legs are each configured to retract to a minimum length and to extend to a maximum length, wherein the lengths of the pair of front legs and the pair of rear legs are configured to be locked at least at the maximum length.

6. The infant car seat assembly of claim 1, wherein the at least two hubs are configured to rotatably lock in at least a second locking position such that the pair of front legs and the pair of rear legs are located above a bottom of a base of the infant car seat, and configured to rotatably lock in a third locking position rotationally between the first locking position and the second locking position.

7. The infant car seat assembly of claim 1, wherein the at least two hubs are configured to rotatably lock in at least a second locking position, wherein when the car seat is secured within a vehicle and the at least two hubs are locked in the second locking position, the pair of front legs and the pair of rear legs are located between a back side of a front seat of the vehicle and a front side of a rear seat of the vehicle.

8. The infant car seat assembly of claim 7, wherein the at least two hubs are configured to rotatably lock in a third locking position.

9. The infant car seat assembly of claim 1, wherein the at least two hubs are not capable of being rotated such that the pair of front legs and the pair of rear legs are located above a bottom of a base of the infant car seat.

10. A method of providing mobility to an infant car seat with an infant car seat assembly, the infant car seat assembly comprising at least two hubs secured to the infant car seat at connections therebetween and being rotatable about the connections, a pair of front legs secured to the hubs at uppermost extents thereof and having at least two wheel assemblies secured to lowermost extents thereof, and a pair of rear legs secured to the hubs at uppermost extents thereof and having at least two wheel assemblies secured to lowermost extents thereof, the method comprising:
    rotatably locking the at least two hubs in at least a first locking position such that the pair of front legs and the pair of back legs are located in a position suitable for supporting and providing mobility to the infant car seat;
    providing mobility to the infant car seat with the infant car seat assembly;
    rotatably unlocking the at least two hubs from the first locking position;
    rotating the at least two hubs about the connections of the at least two hubs and the infant car seat, the pair of front legs and the pair of rear legs rotating in the same direction relative to the infant car seat when the at least two hubs are rotated; and
    securing the infant car seat on a seat of a vehicle without detaching the infant car seat assembly from the infant car seat.

11. The method of claim 10, further comprising pivoting at least one of the pair of front legs and the pair of rear legs about an axis between the uppermost extents thereof within the at least two hubs.

12. The method of claim 11, wherein pivoting the at least one of the pair of front legs and the pair of rear legs comprises:
    unlocking the infant car seat assembly from a first position defined by the lowermost extents of the pair of front legs being located at a maximum distance from the lowermost extents of the pair of rear legs; and
    locating the lowermost extents of the pair of front legs at a minimum distance from the lowermost extents of the pair of rear legs to define a second position of the infant car seat assembly.

13. The method of claim 10, wherein the at least two hubs are permanently fixed to the infant car seat.

14. The method of claim 10, wherein the at least two hubs are configured to be releasably secured to the infant car seat.

15. The method of claim 10, further comprising:

unlocking the pair of front legs and the pair of rear legs from an extended position defined by the pair of front legs and the pair of rear legs being longitudinally extended to a maximum length; and longitudinally retracting the pair of front legs and the pair of rear legs to a minimum length to define a retracted position.

16. The method of claim 10, further comprising:

rotatably locking the at least two hubs in at least a second locking position such that the pair of front legs and the pair of rear legs are located above a bottom of a base of the infant car seat;

unlocking the at least two hubs from the second locking position; and rotatably locking the at least two hubs in a third locking position rotationally between the first locking position and the second locking position.

17. The method of claim 10, further comprising:

rotatably locking the at least two hubs in at least a second locking position, wherein when the car seat is secured within the vehicle and the at least two hubs are locked in the second locking position, the pair of front legs and the pair of rear legs are located between a back side of a front seat of the vehicle and a front side of a rear seat of the vehicle.

18. The method of claim 17, further comprising:

rotatably locking the at least two hubs in a third locking position.

19. An infant car seat assembly for providing mobility to an infant car seat, the infant car seat assembly comprising:

at least two hubs configured to be releasably secured to the infant car seat, the at least two hubs being configured to rotate about connections between the at least two hubs and the infant car seat when the at least two hubs are secured to the infant car seat;

a pair of front legs secured to the hubs at uppermost extents thereof and having at least two wheel assemblies secured to lowermost extents thereof;

a pair of rear legs secured to the hubs at uppermost extents thereof and having at least two wheel assemblies secured to lowermost extents thereof;

wherein at least one of the pair of front legs and the pair of rear legs are configured to pivot about an axis between the uppermost extents thereof within the at least two hubs;

wherein when the infant car seat assembly is releasably secured to the infant car seat, the infant car seat can function in a vehicle without detaching the infant car seat assembly from the infant car seat.

20. The infant car seat assembly of claim 19, wherein the pair of front legs and the pair of rear legs are configured to be rotated relative to the infant car seat when the at least two hubs are rotated about the connections between the at least two hubs and the infant car seat when the at least two hubs are secured to the infant car seat.

* * * * *